US012444885B2

(12) United States Patent
Chen et al.

(10) Patent No.: US 12,444,885 B2
(45) Date of Patent: Oct. 14, 2025

(54) CABLE CONNECTOR

(71) Applicant: BIZLINK (KUNSHAN) CO., LTD., Kunshan (CN)

(72) Inventors: Shi-Jung Chen, Kunshan (CN); Yi-Hsing Chung, Kunshan (CN)

( * ) Notice: Subject to any disclaimer, the term of this patent is extended or adjusted under 35 U.S.C. 154(b) by 363 days.

(21) Appl. No.: 18/098,767

(22) Filed: Jan. 19, 2023

(65) Prior Publication Data

US 2023/0238741 A1 Jul. 27, 2023

(30) Foreign Application Priority Data

Jan. 25, 2022 (CN) ......................... 202210085667.0

(51) Int. Cl.
*H01R 13/633* (2006.01)
*H01R 13/627* (2006.01)

(52) U.S. Cl.
CPC ....... *H01R 13/633* (2013.01); *H01R 13/6275* (2013.01)

(58) Field of Classification Search
CPC .......................... H01R 13/6275; H01R 13/633
USPC ......................................... 439/352, 354, 358
See application file for complete search history.

(56) References Cited

U.S. PATENT DOCUMENTS 7,083,459 B1 * 8/2006 Wu .................... H01R 13/6275 439/354
10,461,473 B1 10/2019 Hsiao
2020/0403330 A1 12/2020 Liao et al.
2021/0135402 A1 5/2021 Li et al.
2021/0249816 A1 * 8/2021 Truong .............. H01R 13/6335
2022/0029355 A1 * 1/2022 Yu .......................... H01R 13/42

FOREIGN PATENT DOCUMENTS

CN 209029582 U 6/2019

* cited by examiner

*Primary Examiner* — Ross N Gushi
*Assistant Examiner* — Thaslimur Rahman
(74) *Attorney, Agent, or Firm* — AGMON LAW PTE LTD

(57) ABSTRACT

The present invention discloses a connector, including a base and a latch, the latch being one piece formed and disposed on the base, wherein one end of the latch having a strap hole portion, and another end of the latch having a pressing portion, wherein the pressing portion is located above the strap hole portion, and when the pressing portion is pressed and moves toward the base, the pressing portion drives the strap hole portion to move toward the base together. In this way, an operator applies force downward on the pressing portion, or pulls the strap horizontally backwards, or pulls the strap upwards in a vertical direction, the strap hole portion can be fully driven down to ensure smooth unlocking of the connector, so that the connector has improved in use reliability and a wider scope of application.

12 Claims, 5 Drawing Sheets

CABLE CONNECTOR

TECHNICAL FIELD

The present invention relates to the field of electronic devices, and in particular, to a connector with latch.

BACKGROUND

In a current common cable connector, a latch is generally used to engage with a connector of a corresponding electronic apparatus, so as to prevent detachment of a cable from the electronic apparatus. For example, the China patent with Publication Number CN209029582U discloses a cable end connector with latch, in which the latch is driven by a strap to deform to separate a cable end connector from the connector of the electronic apparatus.

In an actual operation of unlocking the connector, an operator does not necessarily only pull the strap backwards, and especially in some scenarios where an operating space is limited, may pull the strap vertically upwards. However, when the strap is pulled vertically upwards, the following problems still exist. Firstly, a pressing plate extends backwards from the back of a strap hole. If a user pulls the strap vertically upwards, the strap may interfere with a tail end of the pressing plate, which may cause deformation of the pressing plate, and may cause failure of the connector in severe cases. Secondly, when the connector is of a low profile structure, a thickness of the latch is small. When the user pulls the strap vertically upwards, a bottom plate of the connector may be elastically deformed upwards, which reduces a maximum downward stroke of the pressing plate, causing the pressing plate to fail to sink sufficiently. As a result, a snap-fit protrusion in the front of the connector cannot fully exit a snap-fit opening of the connector of the electronic apparatus, resulting in inability for the two connectors to be effectively separated.

SUMMARY

An objective of the present invention is to provide an improved connector so as to overcome the defects of the prior art.

In order to achieve the above objective, in an example, according to the connector of the present invention, a pressing portion is formed above a strap hole portion. On the one hand, an operator applies force downward on the pressing portion to act on the strap hole portion, so that the strap hole portion moves downwards toward a base to unlock the connector. On the other hand, when the operator unlocks the connector through a strap, no matter whether the strap is pulled horizontally backwards or the strap is pulled upwards in a vertical direction, the strap hole portion can be fully driven down to ensure smooth unlocking of the connector, so that the connector has improved in use reliability and a wider scope of application.

Figure 1:
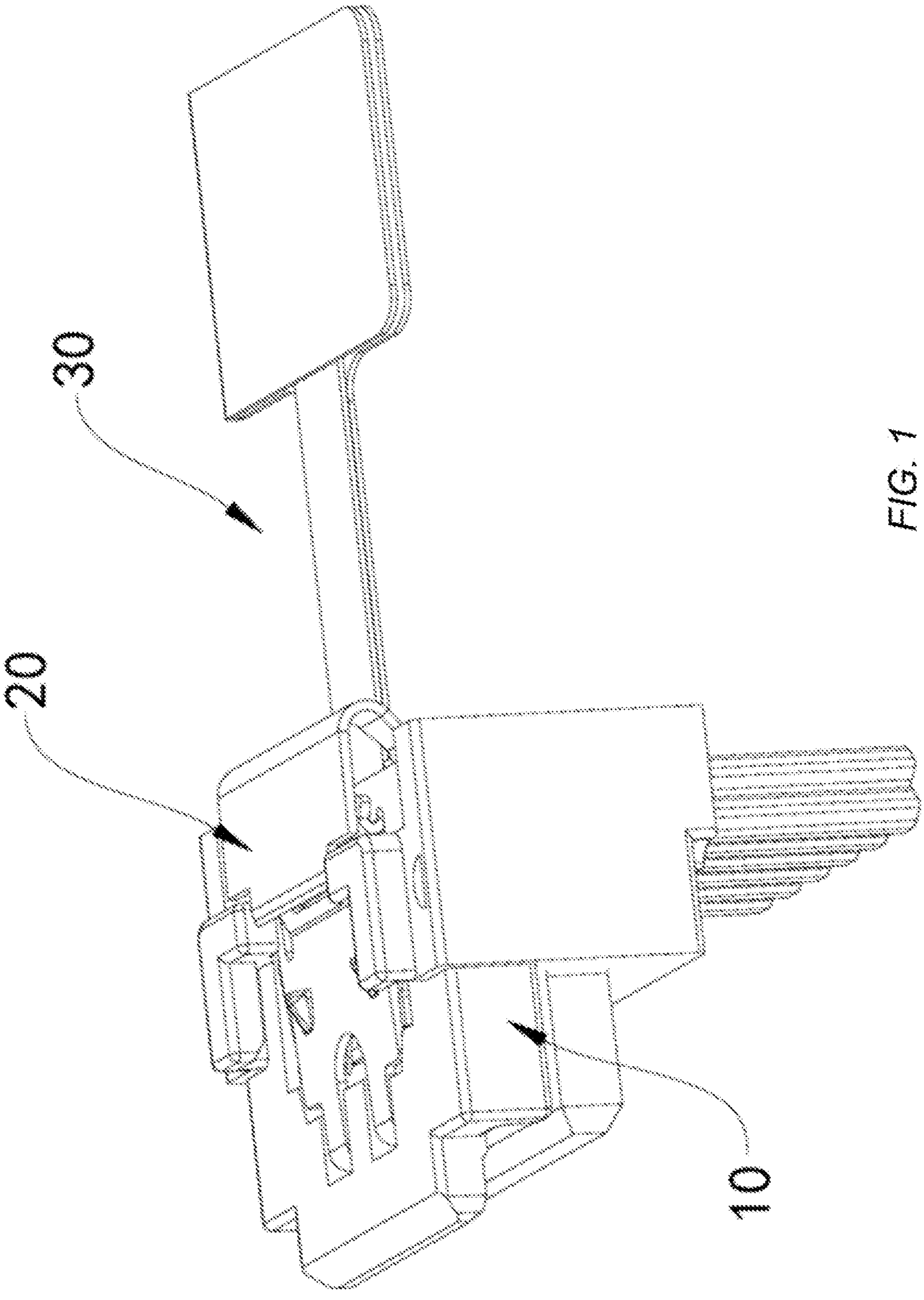
FIG. 1 is a schematic diagram of a three-dimensional structure of a connector according to a specific embodiment of the present invention.
Figure 2:
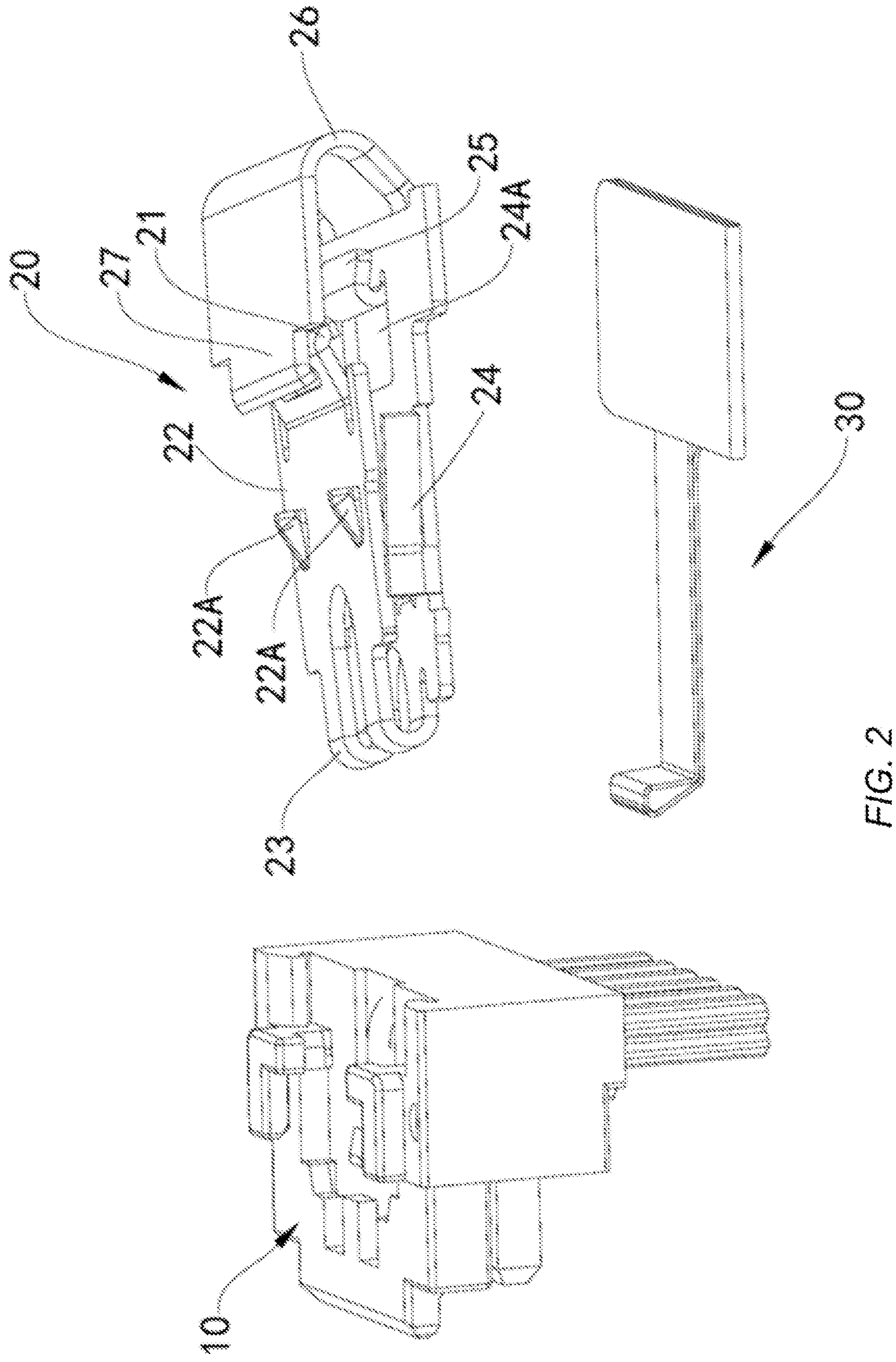
FIG. 2 is a schematic exploded view of a structure of the connector in FIG. 1.
Figure 3:
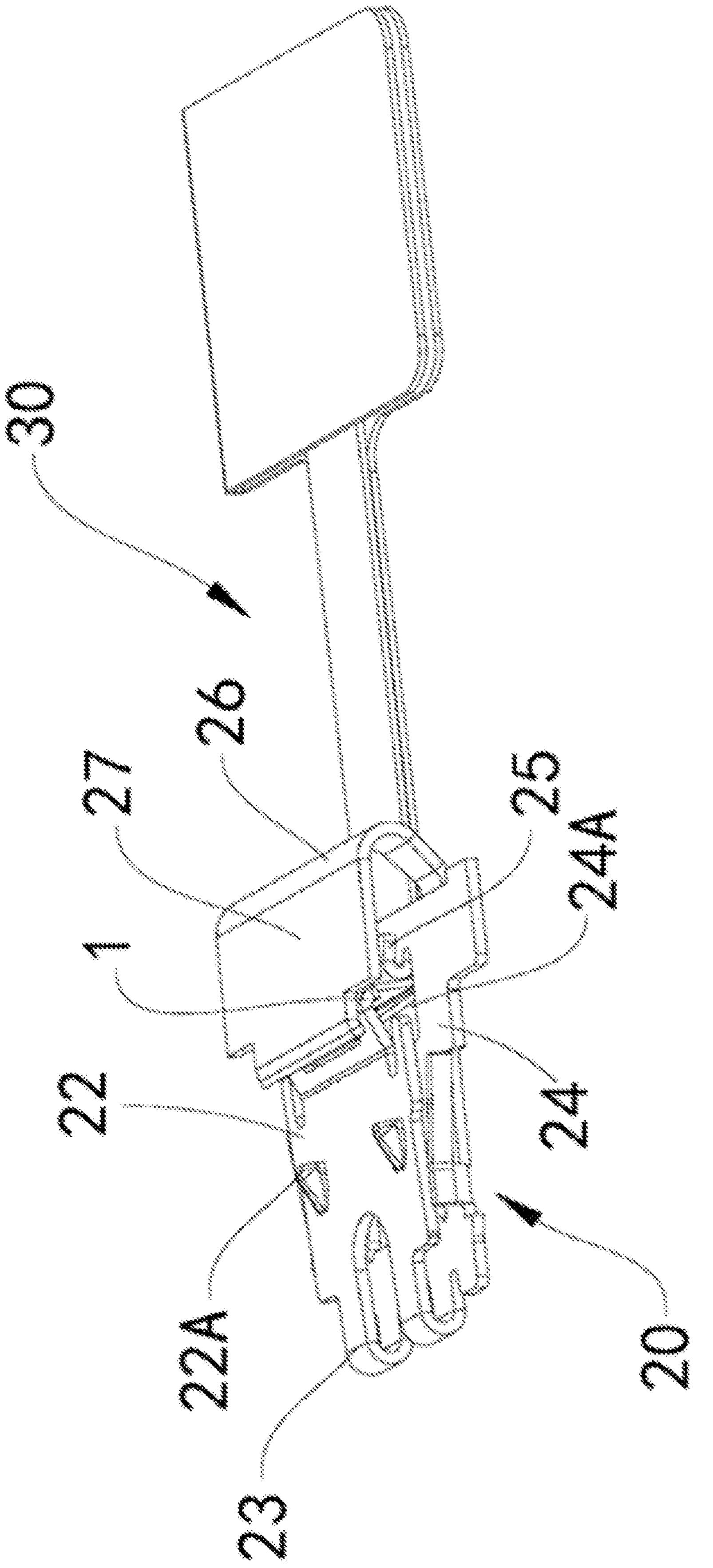
FIG. 3 is a schematic diagram of a three-dimensional structure of the connector in FIG. 1 after removal of a base.
Figure 4:
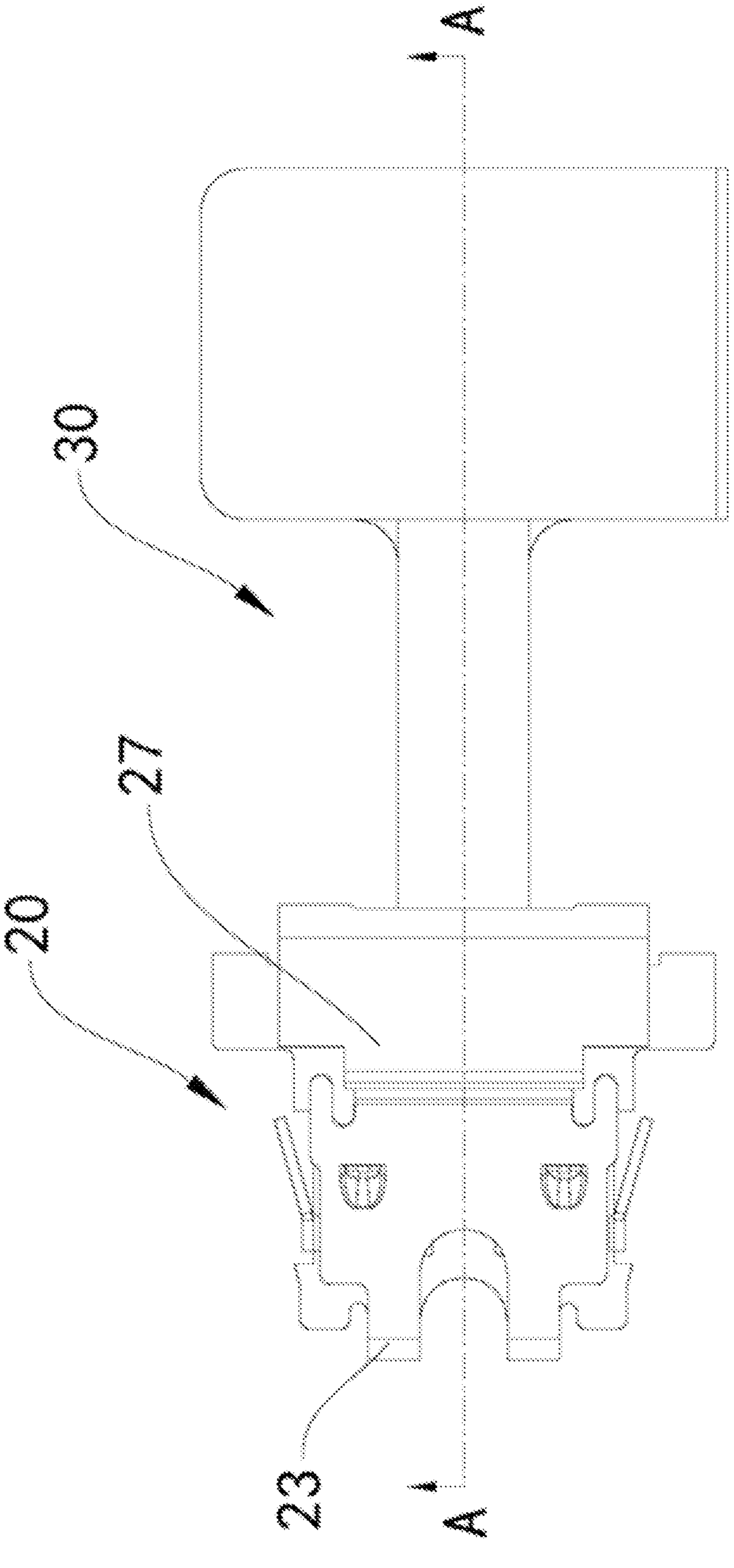
FIG. 4 is a top view of FIG. 3.

In the drawings, 10: base, 20: latch; 21: strap hole portion; 22: first plate; 22A: snap-fit protrusion; 23: U-shaped elastic portion; 24: second plate; 24A: opening; 25: baffle; 26: connecting portion; 27: pressing portion; 30: strap.

DESCRIPTION OF EMBODIMENTS

The following orientation descriptions about front, rear, left, right, up, and down are all referenced and defined according to directions observed by a user when using the connector for a plugging operation. This is only for the convenience of describing relative positional relationships of various components on the connector, and should not be considered as a limitation on specific positions of corresponding structural features. In this embodiment, the front, rear, up, and down directions are marked in FIG. 5 as reference directions.

Refer to a connector shown in FIG. 1 to FIG. 5, which is specifically a connector of a cable, including a base 10, a latch 20, and a strap 30.

In this embodiment, the latch 20 sequentially includes a strap hole portion 21, a first plate 22, a U-shaped elastic portion 23, a second plate 24, a baffle 25, a connecting portion 26, and a pressing portion 27 from one end to the other end. The entire latch 20 is formed by cutting and deforming a metal sheet. That is, the entire latch 20 is one piece formed. The latch 20 is disposed on the base 10.

Figure 5:
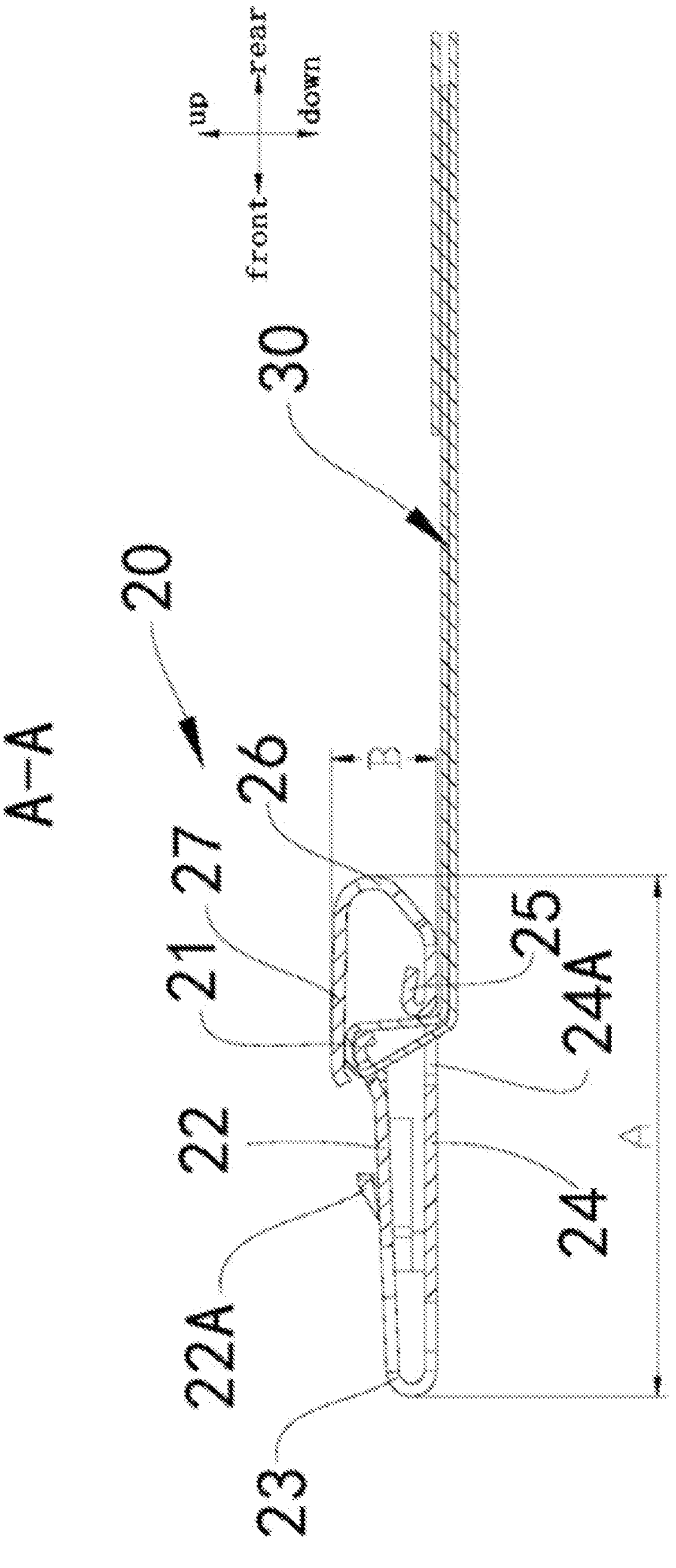
FIG. 5 is a schematic diagram of a sectional structure taken along a direction A-A in FIG. 4.

Specifically, the strap hole portion 21 is located at one end of the latch 20. The strap hole portion 21 has a plurality of perforations for the strap to be wound and pass through. The pressing portion 27 is disposed on the other end of the latch 20. The pressing portion 27 is located above the strap hole portion 21, specifically suspended above the strap hole portion 21. In other embodiments, the pressing portion 27 may be located above the strap hole portion 21 without being in a suspended manner. When necessary, part of the pressing portion 27 may contact and abut against the strap hole portion 21. Herein, the so-called "the pressing portion 27 is suspended above the strap hole portion 21" defines that the two are not in direct contact and the two are connected via the strap 30 as shown in FIG. 5, which is still suspended.

With the design, when the pressing portion 27 is pressed down and moves toward the base 10, the pressing portion 27 drives the strap hole portion 21 to move toward the base 10 together. In this way, when the pressing portion 27 is driven downwards, the strap hole portion 21 can be driven downwards at the same time, so that the latch 20 deforms to drive a snap-fit protrusion 22A downwards to exit a snap-fit opening of the corresponding connector, so as to realize unlocking.

Referring to the drawings, the latch 20 includes the U-shaped elastic portion 23. Two ends of the U-shaped elastic portion 23 are connected to the first plate 22 and the second plate 24 respectively, so that the first plate 22 and the second plate 24 are spaced apart along an up-down direction. In application, the second plate 24 is fixedly mounted to the base 10. An upper surface of the first plate 22 has the snap-fit protrusion 22A protruding upwards. The snap-fit protrusion 22A is configured to be snap-fit with another component (e.g., the snap-fit opening of the corresponding connector) to realize a locked connection.

The strap hole portion 21 is connected with one end of the U-shaped elastic portion 23 via the first plate 22. Herein, the strap hole portion 21 is located at a rear end of the first plate 22.

Referring to the drawings, the connecting portion 26 is connected to a rear end of the second plate 24, and the connecting portion 26 is formed by bending and extending backwards and upwards from the rear end of the second plate 24. Herein, the connecting portion 26 is specifically in a shape of an arc arching backwards, with a side profile in a shape of C. A tail end of the connecting portion 26 is connected to the pressing plate 27. The pressing plate 27 is located on a front side of the connecting portion 26.

A rear portion of the second plate 24 has an opening 24A. The opening 24A is a perforation. The perforation is approximately rectangular and is a closed opening passing through upper and lower surfaces of the second plate 24. The so-called closed opening means that the opening is O-shaped instead of C-shaped. With the design of the closed opening, it can be ensured that the strap 30 is penetrable and can be held therein without escaping from a horizontal direction.

The second plate 24 has a baffle 25 at a side edge of a rear side of the corresponding opening 24A. The baffle 25 is folded upwards and backwards from the side edge, and is deformed toward a direction away from the opening 24A to form an arc surface. The arc surface faces the opening 24A.

The strap hole portion 21 and the baffle 25 are staggered with each other in a vertical (up-down) direction and do not overlap with each other. With the design, when the connector is of a low profile structure (a maximum thickness of the latch 20 along the up-down direction is small), even if the strap hole portion 21 is pressed down and moves toward the base 10 while the bottom plate of the connector (that is, the second plate 24) is slightly deformed upwards, the baffle 25 and the strap hole portion 21 still may not interfere with each other, so that when a pressing orifice plate 1 is pressed down, there is an enough stroke to allow the snap-fit protrusion 22A of the first plate 22 to move downwards and exit the snap-fit opening of the corresponding connector, thereby realizing unlocking.

In addition, one end of the strap 30 is fixed to the strap hole portion 21. The strap 30 is relatively slidably disposed through the opening 24A along its own length direction, and the strap 30 located in the opening 24A is located on a front side of the baffle 25. The arc-shaped baffle 25 can provide the strap 30 with a smooth guide, and at the same time prevent stress concentration caused by direct tensioning of the strap 30 on the side edge of the opening 24A. The other end of the strap 30 is suspended on outer sides of the latch 20 and the base 10 for the user to hold for an unlock operation. In addition, when the user pulls the strap 30 upwards, the arc-shaped connecting portion 26 can also prevent damages to the strap 30 due to direct rubbing against an edge of the latch 20 or stress concentration.

In this way, when the connector is unlocked, there are mainly the following several operation manners.

1. The operator applies force to the pressing portion 27 from top to bottom. During downward movement relative to the base 10, the pressing portion 27 will drive the strap hole portion 21 to move toward the base 10 together, so that the U-shaped elastic portion 23 is deformed to unlock the connector.
2. The operator holds an outer end of the strap 30 and pulls the strap 30 backwards, the strap 30 drives the strap hole portion 21 to move downwards toward the base 10, so that the U-shaped elastic portion 23 is deformed to unlock the connector.
3. The operator holds the outer end of the strap 30 and pulls the strap 30 upwards in a vertical direction. During upward pulling of the strap 30, the strap hole portion 21 is driven to move downwards toward the base 10, so that the U-shaped elastic portion 23 is deformed to unlock the connector. At the same time, a section of the strap 30 passing through the opening 24A and extending along the vertical direction is tensioned on the connecting portion 26, which may neither cause deformation of the pressing portion 27 due to interference with a tail end of the pressing portion 27 nor lead to impossible unlocking of the connector due to upward elastic deformation of the bottom plate of the connector.

With the above arrangement of the connector, a size of the connector can be reduced. In the connector, a maximum depth A of the latch 20 along a front-rear direction is less than 2 cm, and a maximum thickness B of the latch 20 along an up-down direction is less than 1 cm. In some embodiments, the maximum depth A is less than 1.5 cm, and the maximum thickness B is less than 0.7 cm. A ratio A/B of the maximum depth A to the maximum thickness B ranges from 0.5 to 4. Herein, the so-called maximum depth refers to a maximum distance between any two points in the latch 20 along the front-rear direction when the second plate 24 of the latch 20 is placed horizontally on an upper surface of the base 10. Similarly, the so-called maximum thickness refers to a maximum distance between any two points in the latch 20 along the up-down direction when the second plate 24 of the latch 20 is placed horizontally on the upper surface of the base 10. In this embodiment, the connector in this example is inserted forward into another external connector (not shown in the figure).

Based on the above, according to the connector of the present invention, the pressing portion 27 is formed above the strap hole portion 21. On the one hand, the operator applies force downward on the pressing portion 27 to act on the strap hole portion 21, so that the strap hole portion 21 moves downwards toward the base 10 to unlock the connector. On the other hand, when the operator unlocks the connector through the strap 30, no matter whether the strap 30 is pulled horizontally backwards or the strap 30 is pulled upwards in a vertical direction, the strap hole portion 21 can be fully driven down to ensure smooth unlocking of the connector, so that the connector has improved in use reliability and a wider scope of application, which is particularly suitable for the scenarios where an operating space is limited.

What is claimed is:

1. A cable connector, comprising a base and a latch, the latch being one piece formed and disposed on the base, wherein one end of the latch having a strap hole portion, and another end of the latch having a pressing portion, wherein the pressing portion is suspended above the strap hole portion, and when the pressing portion is pressed and moves toward the base, the pressing portion drives the strap hole portion to move toward the base, the latch comprising a first plate and a second plate, the first plate being connected with the second plate via U-shaped elastic portion, wherein a rear end of the second plate is connected with a connecting portion, the connecting portion being formed by bending and extending backwards and upwards from the rear end of the second plate, the connecting portion being connected to the pressing portion, the pressing portion is located on a front side of the connecting portion, and the second plate having an opening the cable connector further comprising a strap, one end of the strap being connected to the strap hole portion the strap passing through the second plate via the opening and being movable in the opening.

2. The cable connector according to claim 1, wherein the connecting portion is in a shape of an arc arching backwards or in a shape of C.

3. The cable connector according to claim 1, wherein a baffle is formed on a side edge of a rear side of the opening, the baffle having an arc surface facing the opening.

4. The cable connector according to claim 3, wherein the strap hole portion is staggered with the baffle in a vertical direction, wherein, when the strap hole portion is pressed down and moves toward the base, the baffle and the strap hole portion do not interfere with each other.

5. The cable connector according to claim 1, wherein, when the strap is pulled backwards or upwards, the strap is capable of driving the strap hole portion to move toward the base.

6. The cable connector according to claim 1, wherein the first plate and the second plate are spaced apart along an up-down direction.

7. The cable connector according to claim 1, wherein the strap hole portion is connected with one end of the U-shaped elastic portion via the first plate.

8. The cable connector according to claim 1, wherein the opening is a closed opening passing through upper and lower surfaces of the second plate.

9. The cable connector according to claim 1, wherein a maximum depth A of the latch along a front-rear direction is less than 2 cm, and a maximum thickness B of the latch along an up-down direction is less than 1 cm.

10. The cable connector according to claim 9, wherein the maximum depth A is less than 1.5 cm, and the maximum thickness B is less than 0.7 cm.

11. The cable connector according to claim 9, wherein A/B=0.5-4.

12. The cable connector according to claim 10, wherein A/B=0.5-4.

* * * * *